Sept. 3, 1963     D. W. TRYHORN     3,102,381
ENGINE INLET-EXHAUST BYPASS MEANS FOR
EXHAUST DRIVEN SUPERCHARGERS
Filed Aug. 4, 1961     2 Sheets-Sheet 1
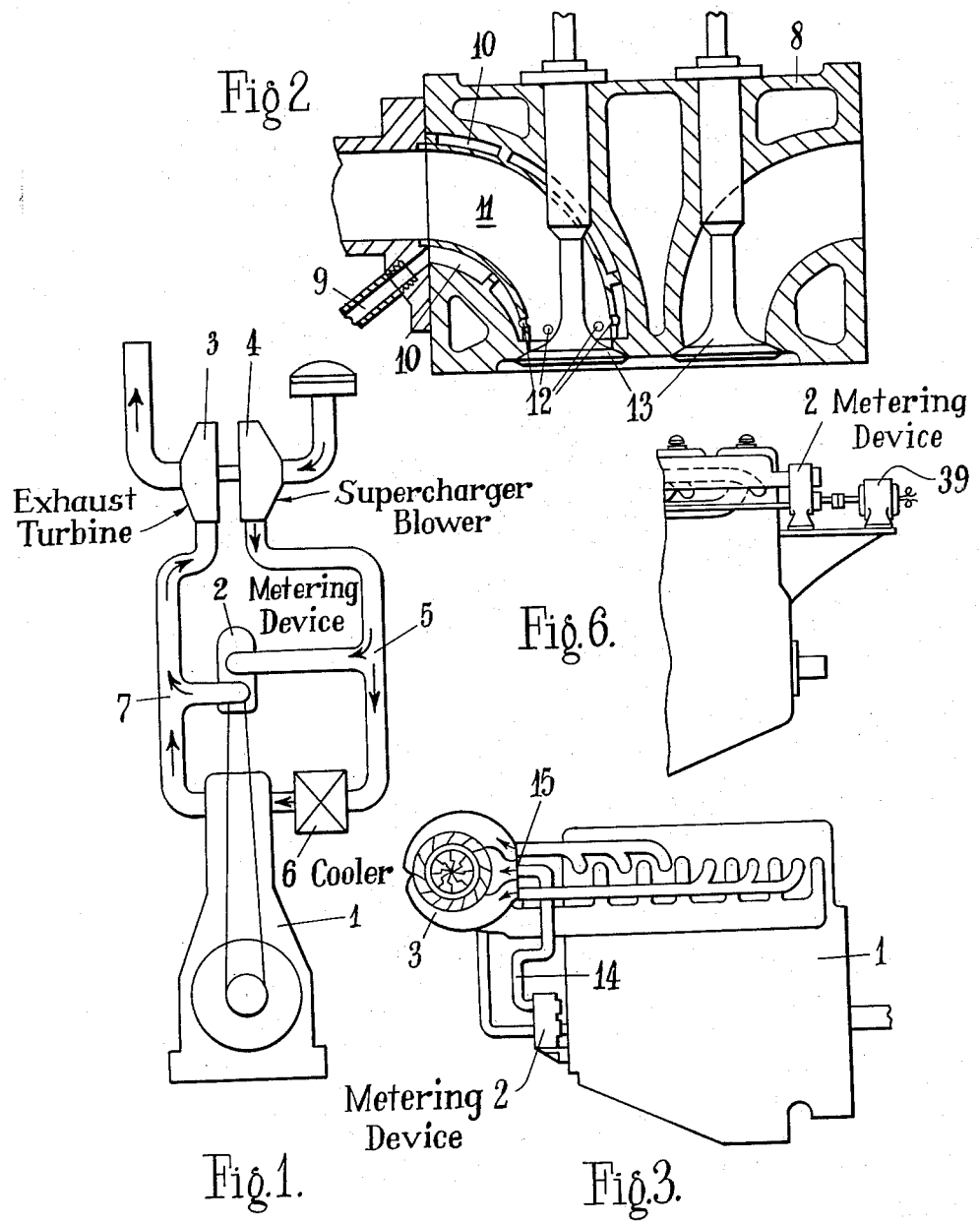

United States Patent Office 3,102,381
Patented Sept. 3, 1963

3,102,381
ENGINE INLET-EXHAUST BYPASS MEANS FOR EXHAUST DRIVEN SUPERCHARGERS
Donald Wilfred Tryhorn, Chalfont St. Peter, England, assignor to The British Internal Combustion Engine Research Association, Slough, England
Filed Aug. 4, 1961, Ser. No. 129,434
Claims priority, application Great Britain Aug. 11, 1960
6 Claims. (Cl. 60—13)

This invention relates to internal combustion engines which are pressure charged by a compressor driven by a turbine actuated by the exhaust gases from the engine, and its object is to widen the range of conditions over which turbocharging of engines gives the desired results.

Many engines do not give the ideal or desired performance when turbocharged, for example, engines having an expansion type or constant pressure exhaust system, very high speed engines, engines with numbers of cylinders which do not divide into groups satisfactorily to suit a pulse type exhaust system, or with siamesed ports, and those in which the combustion chamber does not lend itself to the modifications required for large valve overlap, or which cannot withstand very high cylinder pressures.

It is advantageous, mechanically, that the turbocharger should be free running and not coupled to the engine, but it is this freedom of the machine to choose its own speed and cycle of operations, which makes its thermodynamic performance difficult to control. In some cases it is impossible to obtain a desired charging condition in a particular engine arrangement, although the desired condition has been obtained with the same type of turbocharger in a different engine arrangement.

The present invention provides a degree of control of the turbocharger characteristics, which may be variable, and which ensures that a given turbocharger will operate satisfactorily over a wider range of conditions than normal.

In accordance with the present invention a volume of fresh charge, which may be air, is metered, for example, by being passed through a positive displacement compressing and expanding machine operating in parallel with the engine, so that a predetermined volume of air per engine cycle is taken from the manifolding or duct between the turbocharger compressor and the engine and is delivered into the exhaust manifold or duct at a point between the engine exhaust valve and the turbine, the remainder of the fresh charge passing to the engine in the normal manner.

The invention consists in an improved method of pressure charging an internal combustion engine provided with an exhaust gas driven turbocharger comprising bypassing a metered quantity of fresh charge per engine cycle from the inlet system to the exhaust system.

The invention also consists in an internal combustion engine which is provided with an inlet and an exhaust system, and which is pressure charged by a compressor driven by a turbine actuated by the exhaust gases of the engine characterised in that some of the air from the said compressor is arranged to bypass the engine inlet manifold and passes through a metering device to the said turbine.

The invention further consists in an internal combustion engine as set forth in the preceding paragraph in which the metering device is a compressing and expanding machine coupled to the engine, so that it takes power from the engine when its outlet pressure is higher than its inlet pressure, and gives power to the engine when its inlet pressure is higher than its outlet pressure.

The invention still further consists in an internal combustion engine as set fourth in the preceding paragraph in which the metering device is a positive displacement compressing and expanding machine.

The accompanying drawings show, by way of example only, several embodiments of the invention in which:

FIGURE 1 is a diagrammatic representation of one mode of carrying the invention into effect;

FIGURE 2 is a section through valves of an engine showing a mode of cooling the exhaust valve;

FIGURE 3 shows in elevation and part section an engine having an exhaust turbine provided with a separate inlet to receive the bypassed air;

FIGURE 6 is a fragmentary elevation similar to FIGURE 4 but with a different drive means for the metering device.

Figure 4:
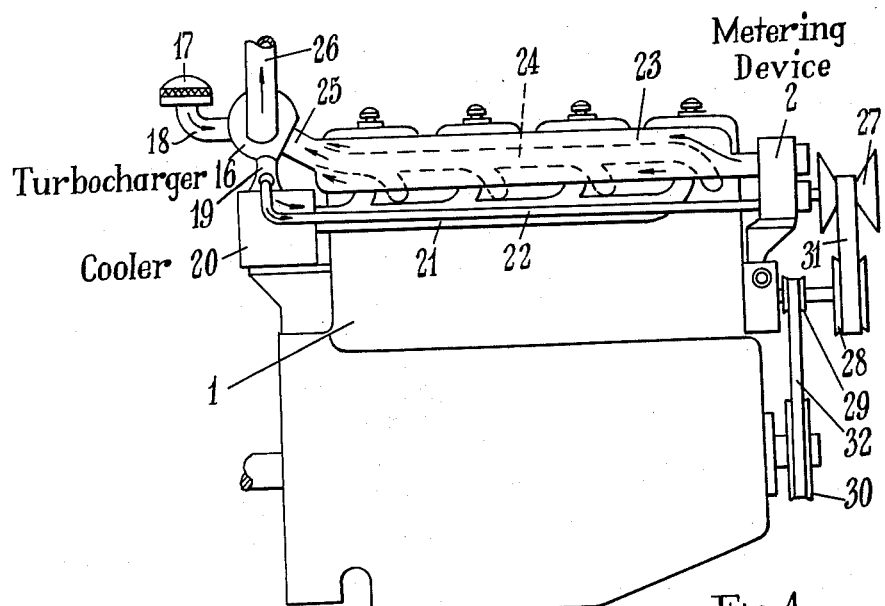
FIGURE 4 shows in elevation an engine having an alternative arrangement.

FIGURE 1 shows an internal combustion engine 1, a metering device 2 comprising an engine driven positive displacement machine and a turbine 3 driving a compressor 4. Air from the compressor 4 is delivered to the duct junction 5 where the flow is divided, a first portion passing to the metering device 2 to form the metered bypassed air, and a second portion passing to the engine 1. A charge cooler 6 may be provided, which is smaller than normal because the total volume of air does not pass through it. If the engine is of the spark ignition type a carburettor is fiitted in this position. The exhaust gases from the engine pass along a duct to junction 7 where they are mixed with the metered bypassed air, and then pass to the turbine 3.

The position of junction 7 may vary with the particular application. For example, it may form a junction of the ducts at any convenient position as indicated in FIGURE 1, or the bypassed air may be used to form a series of jets blowing over the backs of the exhaust valve heads, as shown in FIGURE 2, thereby providing additional valve cooling, while the air gains heat before passing to the turbine. The bypassed air is brought to the cylinder head 8 through duct 9 and enters the space 10 between the cylinder head 8 and the exhaust duct 11. The air enters the duct 11 through holes 12, blows on the head of the valve 13 and joins the steam of exhaust gases. In an alternative arrangement described in detail later the bypassed air may pass through a jacket surrounding the exhaust manifold, before mixing with the exhaust gases, so that the air gains heat, while operator comfort and safety are increased.

In a further alternative, as shown in FIGURE 3, the metered bypassed air may be taken from the metering device 2 by way of the duct 14 to a separate inlet 15 of the turbine nozzle ring, thereby avoiding the decrease in the amplitude of the exhaust pulse which would be caused by the junction 7 of FIGURE 1. In two stroke cycle engines, and when the positive displacement machine is engine or separately driven, this arrangement ensures that the air thereby passed through the turbine nozzles starts the turbine spinning and so provides air for combustion during starting of the engine.

In the simplest case the metering device or machine 2 may be free running, the inertia of the parts of the machine ensuring an approximation to the desired characteristics, but in most applications a machine driven by the engine is preferred.

The machine or device for metering the bypassed air may be any thermodynamic machine which is capable of expansion and compression, the most suitable being a positive displacement compressor or blower, for example of the Roots, lobe, or sliding vane type. Such a metering machine or device has an important feature in this application, in that the volume of air passing through it per cycle is determined by its capacity and speed of operation, and thus the weight of air being bypassed per cycle is not a function of the pressure difference between inlet and exhaust, which in turn is a function of the characteristics of the turbocharger and engine. Consequently, the metering of the bypassed air has a controlling effect upon the weight of air passing to the cylinder of the engine, and upon the output of the turbocharger. The weight of air bypassed is approximately proportional to the weight of air trapped in the cylinder, and therefore the ratio of fuel to total air supplied does not vary appreciably with enigne speed, as it does with any system in which all the air that passes to the exhaust system does so through the cylinder during the period for which the inlet and exhaust valves are open at the same time. Thus the turbine inlet temperature is no longer a feature which limits engine speed. When the charging system is operating inefficiently the metering machine takes power from the engine shaft, and when the system is operating efficiently it gives power to the engine shaft. In any engine system in which during normal operation the difference in pressure between inlet and exhaust is small, so that little power can be obtained from the metering machine, the latter may be a throttle, which preferably should be adjustable in accordance with the load and speed of the engine.

In cases where it is advantageous to vary the volume of air that is being bypassed, other than by variations in the speed of the engine, this may be carried out by providing a drive for the machine which is independent of the engine or a variable speed drive between the engine and the positive displacement machine, or by providing a machine in which the throughput is variable independently of the speed of rotation of the machine. A machine of the latter type is described in British patent specification No. 665,484. Independent variation of the volume of air bypassed, gives an increased degree of control of the air pressure available to the engine, independently of the normal characteristics of a turbocharged engine.

In the arrangement shown in FIGURE 4 air enters the compressor of the turbocharger 16 through air filter 17 and duct 18, and leaves the compressor through duct 19, where the flow is divided, a portion of the air passes to the air cooler 20 and then to the inlet manifold 21 while the other portion of the air passes along duct 22 to the metering device or machine 2. Air from the metering device passes into the jacket 23 surrounding the exhaust manifold 24. The exhaust gases from the manifold 24 and the air from the jacket 23 enter the turbine of the turbocharger 16 through duct 25, and leave the turbine through duct 26.

The metering device 2 may be driven from the engine by pulleys 27, 28, 29 and 30 and belts 31 and 32, and pulleys 27 and 28 and belt 31 may be of the variable speed type whereby the ratio of the drive between engine and metering device or machine may be varied. When the metering device is to be driven independently of the engine, the independent driving means may be mounted in the position shown for pulleys 27 or 29 in FIGURE 4.

Figure 5:
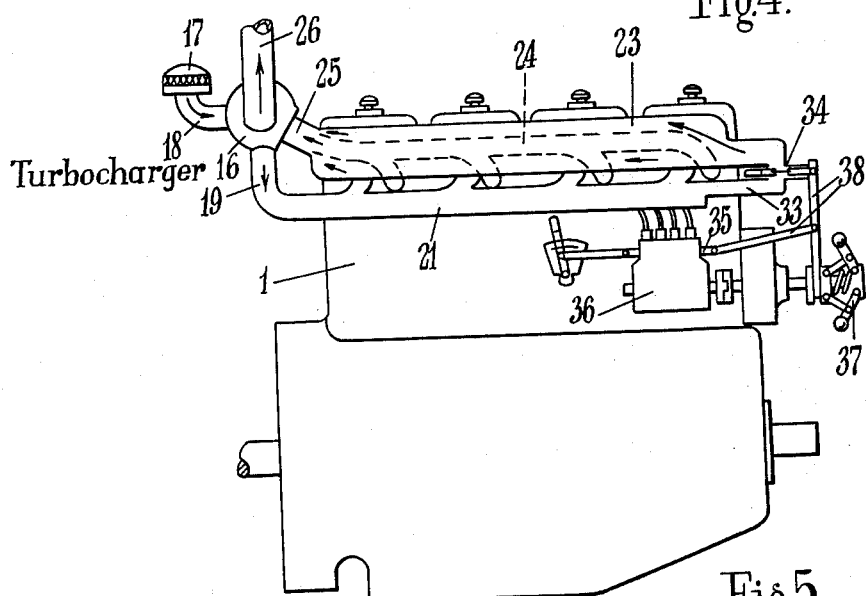
FIGURE 5 shows in elevation a still further arrangement.

The arrangement shown in FIGURE 5 is similar to that shown in FIGURE 4 except that no cooler is provided and all the air from the compressor is passed into the inlet manifold 21. Duct 33 leads from the manifold 21 to a variable throttle device 34, acting as a metering device, and air passing through this throttle device enters the jacket 23 surrounding the exhaust manifold 24, or it may enter the exhaust manifold when no jacket is provided. The variable throttle 34 is controlled by the combined action of the rack control rod 35 of the fuel injection pump 36 and the governor 37, through a suitable linkage 38.

The metering machine or device 2 is small compared with a normal positive displacement pressure charger for a given engine, since it deals with a portion only of the total air, and only a light drive is required because it operates over only the pressure difference between the inlet and exhaust manifolds.

The device of FIGURE 6 differs from the device of FIGURE 4 in using an electric motor 39 in place of the mechanical drive 27, 28 29, 30, 31 and 32, the metering device being coupled to the engine electrically instead of mechanically. The operation of the device is the same as of the device of FIGURE 4.

A further advantage of the system is that because the air required to cool the exhaust gases does not pass through the engine, the period during which the inlet and exhaust valves are open at the same time can be reduced, with consequent reduction in the depth of the recesses normally required in the piston crown to ensure that the latter does not hit the valve heads, near T.D.C.

It is to be understood that the above description is by way of example only and that details for carrying the invention into effect may be varied without departing from the scope and the invention claimed.

I claim:

1. In an internal combustion engine having inlet and exhaust systems, a compressor for supplying air under pressure to said inlet system, a turbine actuated by the exhaust gases from said exhaust system drivingly connected to said compressor, bypass means connected to said inlet and outlet systems to transfer a metered quantity of air per engine cycle directly from said inlet system to said outlet system, said bypass means comprising a compressing and expanding metering device coupled to the engine so that it takes power from the engine when the pressure is higher in said exhaust system than in said inlet system, and gives power to the engine when the pressures are reversed.

2. Apparatus as claimed in claim 1, in which the compressing and expanding metering device is coupled to the engine by means of a variable speed device.

3. Apparatus as claimed in claim 1, in which the compressing and expanding metering device is of the type in which the throughput of air is variable independently of the speed of rotation of the device.

4. In combination with an internal combustion engine having an inlet manifold and an exhaust manifold, a turbine mounted to be driven by exhaust from said exhaust manifold, a blower driven by said turbine connected to said inlet manifold to provide air under pressure in said intake manifold, a positive displacement device having a shaft and capable of being driven to operate as a pump having a suction side and a discharge side, said shaft being operatively connected to said engine to rotate at a speed determined by the engine speed, the suction side of said positive displacement device being connected between said blower and said intake manifold, and said discharge side being connected to said exhaust manifold between said discharge manifold and said turbine.

5. In a supercharged internal combustion engine having an air intake system comprising a blower, air intake manifold, a connection between said blower and said intake manifold, and an exhaust system comprising a passage in the engine adjacent an exhaust port, an exhaust manifold, a turbine, and a connection between said manifold and said turbine, the novelty comprising a rotary compression device of the type that will also operate as a motor, positively connected to rotate at a fixed speed ratio with respect to said engine and having an inlet side and an outlet side when operating as a pump, said inlet side being connected to said inlet system and said outlet being connected to said outlet system.

6. The internal combustion engine of claim 5, in which said outlet connected to said exhaust system discharges air into said exhaust system into said passage in the engine adjacent said exhaust port, whereby the portions of the engine surrounding said passage are cooled.

References Cited in the file of this patent

UNITED STATES PATENTS

| | | |
|---|---|---|
| 2,065,106 | Symons | Dec. 22, 1936 |
| 2,385,366 | Lysholm | Sept. 25, 1945 |
| 2,400,068 | Birkigt | May 14, 1946 |